(12) United States Patent
Crispin (10) Patent No.: US 10,240,898 B2
(45) Date of Patent: Mar. 26, 2019

(54) REFLEX SIGHT WITH MULTIPLE AIMING MARKS

(71) Applicant: Leupold & Stevens, Inc., Beaverton, OR (US)

(72) Inventor: Quint Dean Crispin, Beaverton, OR (US)

(73) Assignee: LEUPOLD & STEVENS, INC., Beaverton, OR (US)

( * ) Notice: Subject to any disclaimer, the term of this patent is extended or adjusted under 35 U.S.C. 154(b) by 0 days.

(21) Appl. No.: 15/802,053

(22) Filed: Nov. 2, 2017

(65) Prior Publication Data

US 2018/0128574 A1     May 10, 2018

Related U.S. Application Data

(60) Provisional application No. 62/419,369, filed on Nov. 8, 2016.

(51) Int. Cl.
    *F41G 1/30*     (2006.01)
    *G02B 23/10*    (2006.01)
    *F41G 1/34*     (2006.01)

(52) U.S. Cl.
    CPC ............... *F41G 1/30* (2013.01); *F41G 1/345* (2013.01); *G02B 23/105* (2013.01)

(58) Field of Classification Search
    CPC .......... F41G 1/30; F41G 1/345; G02B 23/105
    USPC ......................................................... 42/113
    See application file for complete search history.

(56) References Cited

U.S. PATENT DOCUMENTS

| | | | | |
|---|---|---|---|---|
| 4,764,011 A * | 8/1988 | Goldstein | ................. | F41G 1/30 356/251 |
| 5,205,044 A * | 4/1993 | DePaoli | ............... | G02B 23/105 42/132 |
| 2006/0107581 A1* | 5/2006 | Ball | .......................... | F41G 1/01 42/130 |
| 2006/0162226 A1* | 7/2006 | Tai | ............................ | F41G 1/30 42/132 |
| 2011/0283589 A1* | 11/2011 | Matthews | ................ | F41A 33/00 42/113 |
| 2012/0110887 A1* | 5/2012 | Reimer | ..................... | F41G 1/30 42/132 |
| 2013/0145666 A1* | 6/2013 | Eriksson | ................... | F41G 1/30 42/1.06 |

* cited by examiner

*Primary Examiner* — Bret Hayes
(74) *Attorney, Agent, or Firm* — Bennet K. Langlotz; Langlotz Patent & Trademark Works, LLC (57) ABSTRACT

A reflex sight with multiple aiming marks has a body having a forward end extending in forward direction and an opposed rearward end extending in a rearward direction, a first optical element having a first concave surface facing in the rearward direction, the first concave surface having a first focal point, a second optical element having a second concave surface facing in the rearward direction, the second concave surface having a second focal point, a first emitter proximate the first focal point and spaced apart from the second focal point, a second emitter proximate the second focal point and spaced apart from the first focal point, and the first optical element being forward of the second optical element. The first and second emitters may both be rearward of the first and second optical elements. The second emitter may be spaced apart rearwardly from the first emitter.

31 Claims, 11 Drawing Sheets

REFLEX SIGHT WITH MULTIPLE AIMING MARKS

CROSS-REFERENCE TO RELATED APPLICATION

This application claims the benefit of U.S. Provisional Patent Application No. 62/419,369 filed on Nov. 8, 2016, entitled "REFLEX SIGHT WITH MULTIPLE AIMING MARKS," which is hereby incorporated by reference in its entirety for all that is taught and disclosed therein.

FIELD OF THE INVENTION

The present invention relates to sighting systems for projectile weapons and, more particularly, to a reflex sight system with multiple aiming marks for aiming under multiple different shooting situations.

BACKGROUND OF THE INVENTION

Conventional reflex sights are optical aiming sights for projectile weapons—such as rifles, pistols, and crossbows, for example—that reflect an aiming mark on a reflector for superimposition on a distant target. Typically, the reflector is spherical and partially reflective or reflective of a specific wavelength of light. Some reflex sights use a collimating lens and a flat reflector, rather than a spherical reflector. In either approach, the reflected light reaches the user's eye as collimated light, so that the user will see an image of the aiming mark superimposed in the sight's field of view in focus at all distances. The sight is affixed to the weapon and aimed so that the aiming mark coincides with a point of impact of a projectile at a predetermined sighted-in range, when fired or launched from the weapon.

Since the image of the aiming mark produced by the reflex sight is made up of collimated light aligned with the weapon, the aiming feature appears to be parallax free. That is, the user can look through the reflector from any vantage point and the aiming feature will appear stationary on the target so long as the target is viewed through the reflector.

Conventional reflex sights offer only a single aiming feature that is difficult to adjust (e.g., when sighting-in) because the aim is so sensitive to the position of the illumination source for the aiming mark and because it is challenging to implement precise mechanical adjustment devices in the miniature platform of most reflex sights. All projectile weapons require a different point of aim for shooting targets located at different ranges. Also, some projectile weapons can shoot different types of ammunition, such as subsonic or supersonic ammunition, that result in different points of impact.

Thus, although conventional sights are generally suitable for their intended purpose, they offer only a single aiming feature that can be adjusted to align with one type of ammunition in a given firearm. However, most firearms can shoot different types of ammunition that result in different points of impact because of different muzzle velocities. Conventional sights are also limited to sighting in only one distance for one projectile, which could adversely affect accuracy at distances that dramatically differ from the sighted in distance. Furthermore, a dual barrel/caliber firearm such as a double rifle or a rifle/shotgun combination firearm requires two conventional sights, one for each barrel. A conventional approach using two singular reflex or "red dot" sights in series can be used in some of these circumstances, but this solution is impractical in many applications because of insufficient mounting area for two reflex sights on many firearms, or an excessive increase in weight resulting from the use of two sights.

Therefore, a need exists for a new and improved reflex sight that provides for multiple spaced-apart aiming marks, thereby enabling the user to select from among the aiming marks to more accurately align the target with the projectile weapon's point of impact based on the ammunition type or the range to target. In this regard, the various embodiments of the present invention substantially fulfill at least some of these needs. In this respect, the reflex sight system according to the present invention substantially departs from the conventional concepts and designs of the prior art, and in doing so provides an apparatus primarily developed for the purpose of enabling the user to select from among the aiming marks to more accurately align the target with the projectile weapon's point of impact based on the ammunition type or the range to target.

SUMMARY OF THE INVENTION

The present invention provides an improved reflex sight with multiple aiming marks, and overcomes the above-mentioned disadvantages and drawbacks of the prior art. As such, the general purpose of the present invention, which will be described subsequently in greater detail, is to provide an improved reflex sight with multiple aiming marks that has all the advantages of the prior art mentioned above.

To attain this, the preferred embodiment of the present invention essentially comprises a body having a forward end extending in forward direction and an opposed rearward end extending in a rearward direction, a first optical element having a first concave surface facing in the rearward direction, the first concave surface having a first focal point, a second optical element having a second concave surface facing in the rearward direction, the second concave surface having a second focal point, a first emitter proximate the first focal point and spaced apart from the second focal point, a second emitter proximate the second focal point and spaced apart from the first focal point, and the first optical element being forward of the second optical element. The first and second emitters may both be rearward of the first and second optical elements. The second emitter may be spaced apart rearwardly from the first emitter. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

An embodiment of the reflex sight with multiple aiming marks of the present invention is shown and generally designated by the reference numeral 100.

The illustrated figures are schematic, and not necessarily to scale or with all optical geometries accurately rendered. Some curves and contours are exaggerated for illustrative purposes, and other characteristics are omitted for simplicity. For instance, where rays are illustrated as passing through a non-magnifying lens with a base curve that does not affect the subject viewed through it, they may be shown as passing straight through unaffected, when in actuality there will be offsetting deviations at each surface.

Figure 1:
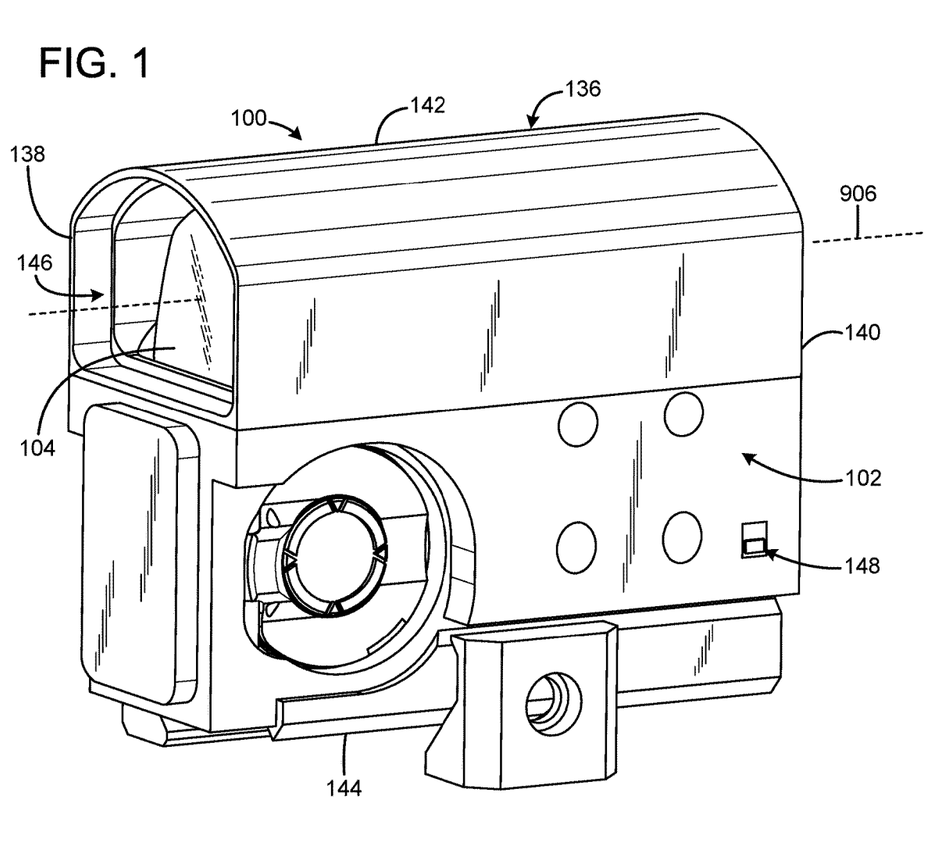
FIG. 1 is a top isometric view of the current embodiment of the reflex sight with multiple aiming marks constructed in accordance with the principles of the present invention having two light sources and two curved reflector lenses.
Figure 2:
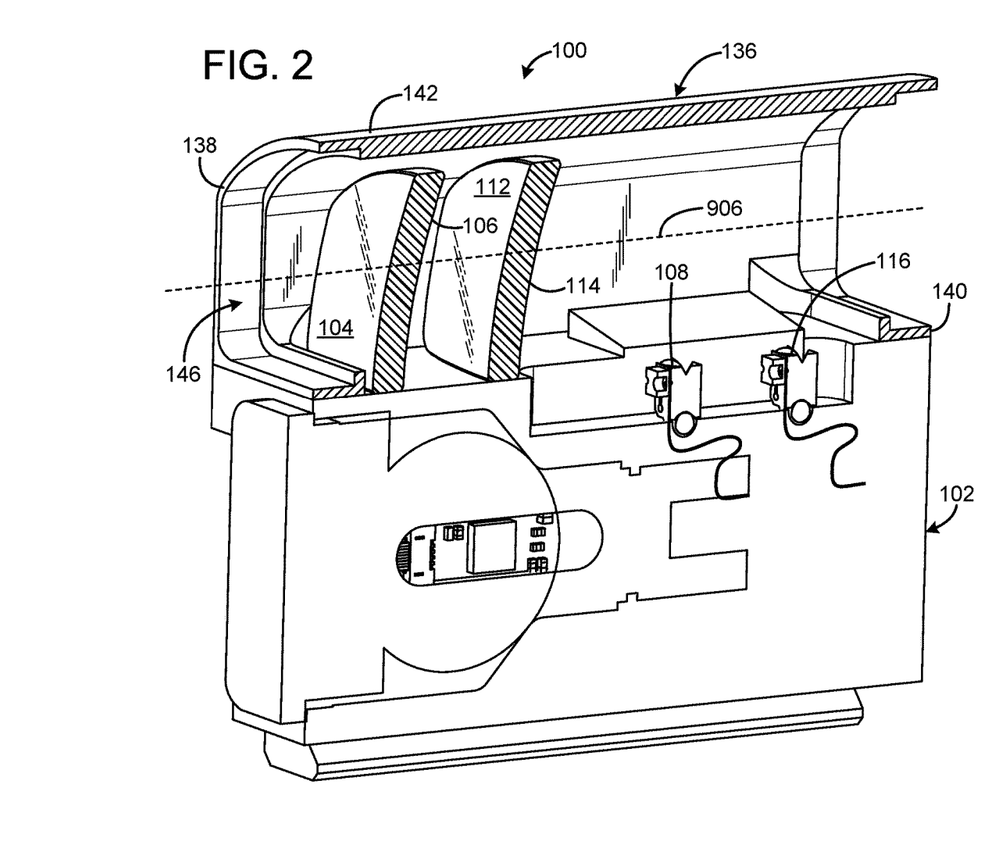
FIG. 2 is a top sectional isometric view of the current embodiment of the reflex sight with multiple aiming marks of FIG. 1.
Figure 3:
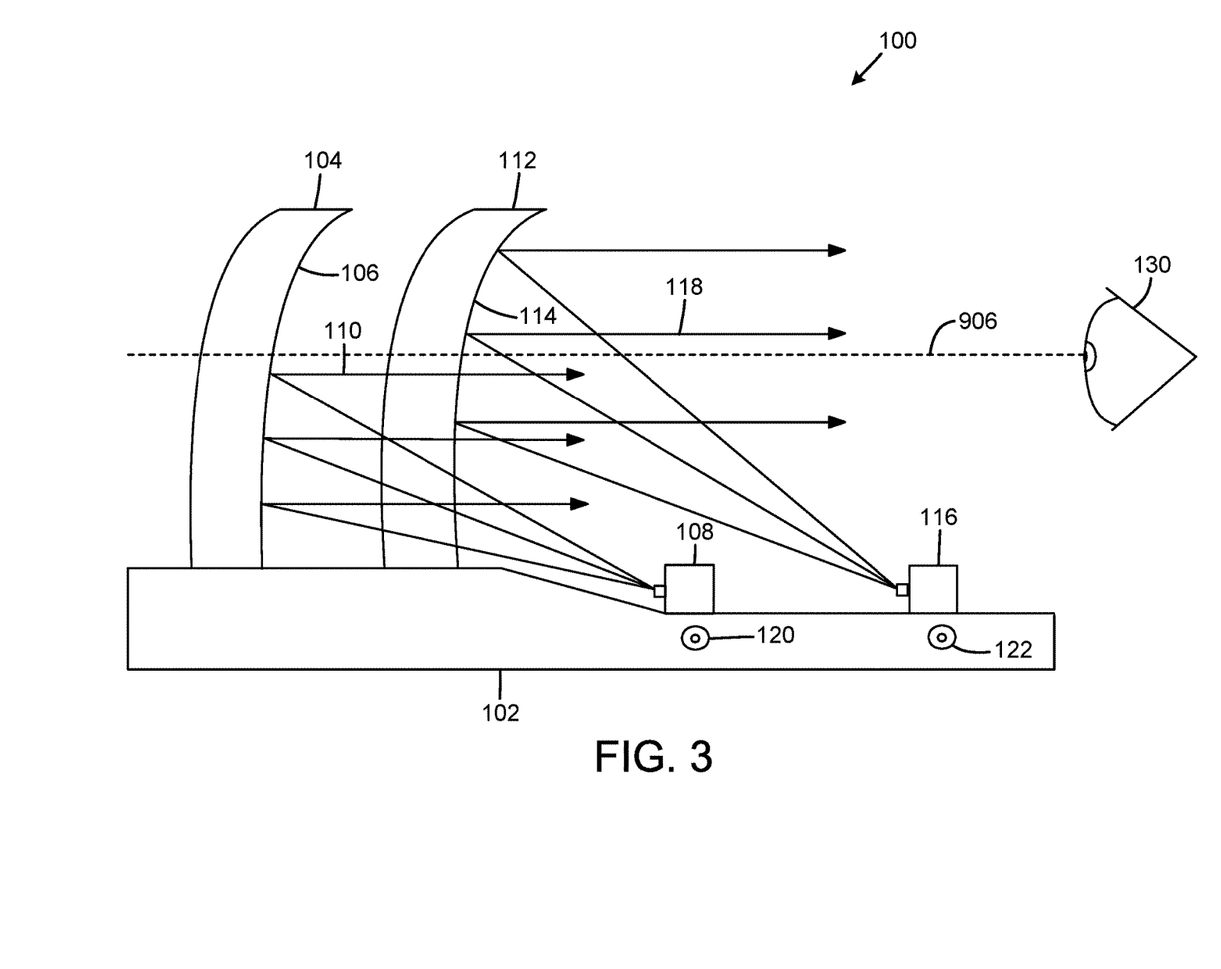
FIG. 3 is a side view of the current embodiment of the reflex sight with multiple aiming marks of FIG. 1.

FIGS. 1-3 illustrate the improved reflex sight with multiple aiming marks 100 of the present invention. More particularly, the reflex sight with multiple aiming marks 100 has a housing 136 having a front 138, rear 140, top 142, bottom 144, and aperture 146. The aperture 146 extends from the front 138 to the rear 140 of the housing 136 and defines a sight line axis 906 extending from a target (not shown) to a viewer's eye 130. The top 142 of the housing 136 is an arch to accommodate a first optical element 104 and a second optical element 112. The housing 136 includes a body 102 having a forward end extending in a forward direction and an opposed rearward end extending in a rearward direction that serves as a support for optical elements 104, 112, electronics, and other components subsequently described. In the current embodiment, each optical element 104, 112 is a lens with a base curve having limited distortive effect on images viewed through the lenses. The optical elements 104, 112 act as a first transmissive optical element and a second transmissive element sequentially interposed along the sight line axis 906 to transmit an image of the target to a viewer's eye 130. A selector switch 148 can be attached to the housing 136 at any suitable location such that the user can select which of the light sources 108, 116 is illuminated for viewing through the rear 140 of aperture 146.

Mounted on the body 102 is a first primarily-transparent optical element 104, formed from a section of a lens, mounted in an upright position on a forward portion of body 102. The first optical element 104 is curved and has a partially-reflective surface 106 forming a concave reflector/first concave surface facing in the rearward direction and having a first focal point. Also mounted on the body 102, in an upright position rearward of the first optical element 104, is a second optical element 112 formed from a section of a second lens or a second section of the same lens as first optical element 104 and having a spherically-curved second partially-reflective surface 114 forming a concave reflector/second concave surface facing in the rearward direction and having a second focal point. The term "partially-reflective surface" refers to a surface having a desired level of reflectivity over a specified range of wavelengths of light.

A first light source/emitter 108, such as a light emitting diode (LED) masked to form a fine point source of illumination, is attached on the body 102 in association with the first optical element 104 at/proximate the first focal point of the concave reflector of the first partially-reflective surface 106 and rearward of the second optical element 112, such that the first light source 108 is spaced apart from the second focal point. Partially-reflective surface 106 is preferably made of a dichroic reflection coating or layers on the rear surface of first optical element 104. The dichroic reflecting coating selectively reflects the wavelength of the LED of first light source 108 to project an image of the first light source/emitter 108 in a rearward direction as collimated light 110 along an optical path extending between the forward end and the rearward end, and through both the first and second optical elements 104, 112. However, the dichroic reflecting coating is generally transmissive to other wavelengths of visible light so that a user views a field of view 904 (FIG. 11) including a target through the first optical element 104. The partially-reflective surface 106 is spherically curved so that light emitted from the first light source 108 is reflected rearward toward a user's eye 130 by the partially-reflective surface 106 as collimated light 110, such that a user looking through the optical element 104 perceives the reflected light as an image of the first light source/emitter 108 forming a first luminous aiming mark 900 (FIG. 11) superimposed on, and in focus with, targets located at any distance. In other words, the first luminous aiming mark 900 is imaged at infinity focus.

A second light source 116, such as an LED, is attached on the body 102 spaced apart rearwardly from the first light source 108 in association with the second optical element 112 at/proximate the second focal point of the concave reflector of the second partially-reflective surface 114 and spaced apart from the first focal point. Thus, the first light source/emitter 108 and second light source/emitter 116 are both rearward of the first optical element 104 and second optical element 112. The radiuses of curvature of the first and second partially-reflective surfaces 106, 114 may be the same or slightly different. Light emitted from the second light source 116 is reflected rearward toward the user's eye 130 by the partially-reflective surface 114 as collimated light 118, so that a user looking through the second optical element 112 perceives the reflected light as an image of the second light source/emitter 116 forming a second luminous aiming mark 902 (FIG. 11) superimposed on, and in focus with, a target at any distance (infinity focus). Depending upon the position of selector switch 148, just first luminous aiming mark 900, just second luminous aiming mark 902, or both luminous aiming marks 900, 902 are visible.

The first light source 108 and the second light source 116 preferably output/emit radiation in the form of visible light at different wavelengths. The first light source emits radiation at a first wavelength, and the second light source emits radiation at a different second wavelength. The first and second partially-reflective concave surfaces 106, 114 have dichroic coatings such that the first concave surface has a first reflective characteristic, and the second concave surface has a different second reflective characteristic. In the current embodiment, the first characteristic is relatively greater reflectivity of the first wavelength than the second wavelength, and the second characteristic is relatively greater reflectivity of the second wavelength than the first wavelength. Preferably, the first and second partially selective surfaces 106, 114 are selectively reflective to the wavelengths of the light emitted by the respective first and second light sources 108, 116, while being highly transmissive of other wavelengths of visible light. So, for example, collimated light reflected rearwardly by first partially-reflective surface 106 will pass through second partially-reflective surface 114 and to the user's eye 130. Alternatively, the first and second light sources 108, 116 could output light at the same wavelength, in which case the second partially-reflective surface 114 must be partially reflective of the wavelength (e.g., 40%-60% transmissive, or preferably approximately 50% transmissive), to allow light from first light source 108 reflected rearwardly by first partially-reflective surface 106 to pass therethrough, albeit with its intensity attenuated. Since the second light source 116 is spaced apart from first light source 108, and therefore located away from the focal point of the first partially-reflective surface 106, light from the second light source 116 that passes through the partially-reflective surface 114 is not reflected by the first partially-reflective surface 106 as collimated light.

When a user looks along a viewing path through both the first and second optical elements 104 and 112 toward a target, a user perceives distinct first and second luminous aiming marks 900, 902 (FIG. 11) spaced apart in the field of view 904, superimposed on, and in focus with, the target at any distance (infinity focus). If the first and second light sources 108, 116 are different colors, then the colors of the resulting aiming marks 900, 902 may be selected to identify one as the primary aiming mark and the other as a secondary aiming mark. The secondary aiming mark may be used for hold-over aiming, when shooting at targets beyond the sighted-in range of the first aiming mark. Alternatively, more than two aiming marks could be generated using light sources having more than one point source of light, such that each reflector generates images of multiple spaced-apart aiming marks. When more than two aiming marks are generated, the multiple aiming marks may be spaced horizontally to provide windage aiming or for other purposes.

Each of the first light source 108 and the second light source 116 may be movably mounted on body 102 and adjusted by a respective first and second adjustment facility/ windage screw 120, 122 and/or an elevation screw (not shown), as described for example in U.S. Pat. No. 9,423,212 of Campean, which is incorporated herein by reference. Independent screw adjuster mechanisms allow the positions of first and second light sources 108, 116 to be adjusted relative to partially-reflective surfaces 106, 114 independently of each other to thereby adjust the positions of the luminous aiming marks 900, 902 relative to each other and relative to a target (not shown) in the field of view 904. Thus, the first adjustment facility 120 is adapted to move the apparent image 900 of the first light source/emitter 108 as reflected in the first partially-reflective surface 106, and the second adjustment facility 122 is adapted to move the apparent image 902 of the second light source/emitter 116 as reflected in the second partially-reflective surface 114. For example, the first light source 108 may be moved laterally or vertically via the windage screw 120 and/or an elevation screw (not shown) while the second light source 116 remains in place, so that only the first luminous aiming mark position changes, or vice versa.

The first light source 108 and the second light source 116 are positioned on the body 102 relative to the first optical element 104 and the second optical element 112 so that the luminous aiming marks appear spaced apart. Thus, the second optical element 112 is interposed between the first optical element 104 and the first light source/emitter 108, such that emissions from the first light source 108 are transmitted through the second optical element 112 before reflecting off the first partially-reflective surface 106, and a reflected image from the first partially-reflective surface 106 is transmitted through the second optical element 112 before reaching a viewer's eye 130 rearward of the reflex sight with multiple aiming marks 100. The first partially-reflective surface 106 may have a radius of curvature and focal length that is the same or slightly different from the radius of curvature and focal length of the second partially-reflective surface 114, allowing the optical elements 104, 112 and light sources 108, 116 to be arranged on body 102 in different ways, or to achieve different spacing between the luminous aiming marks 900, 902.

Figure 4:
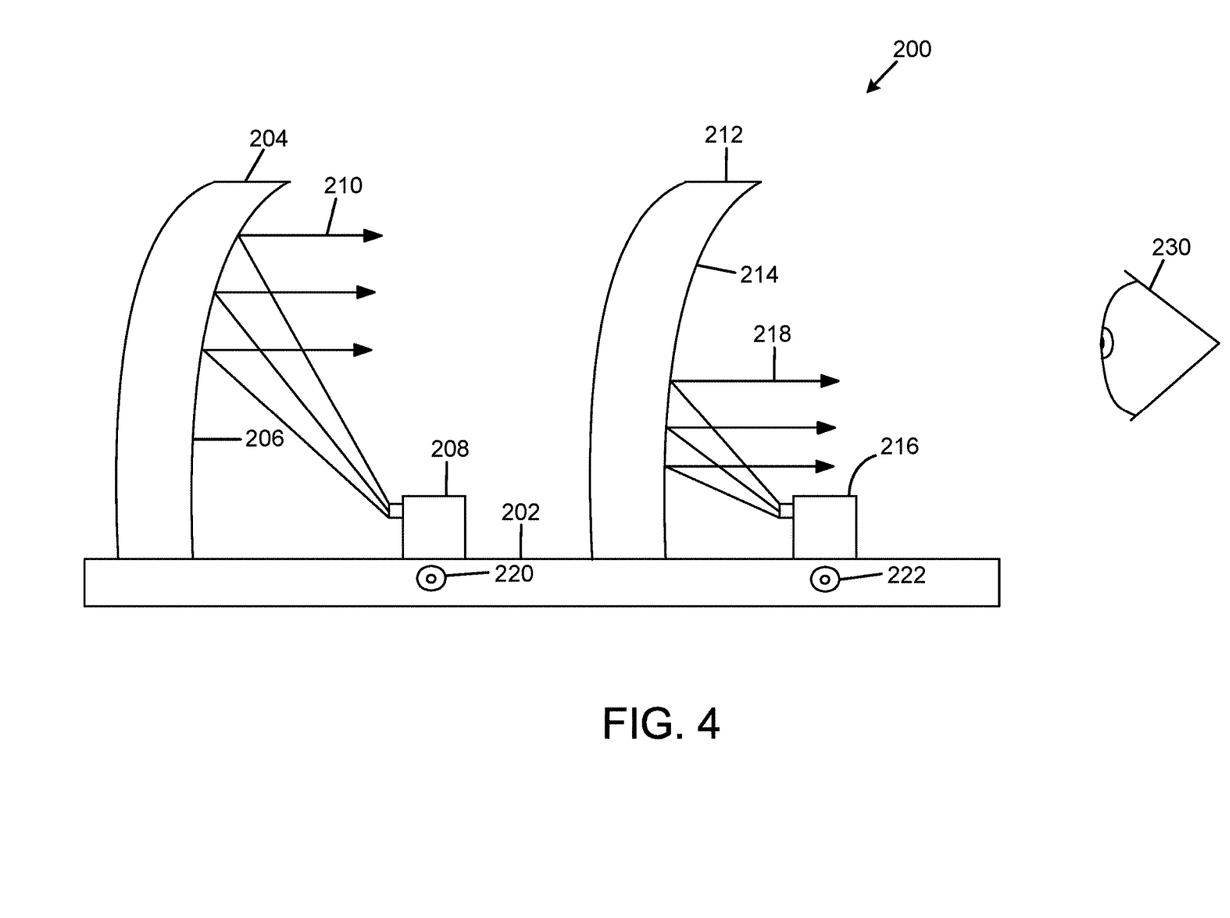
FIG. 4 is a side view of a first alternative embodiment of the reflex sight with multiple aiming marks having two light sources and two curved reflector lenses.

FIG. 4 illustrates a first alternative embodiment of the improved reflex sight with multiple aiming marks 200 of the present invention. More particularly, the reflex sight with multiple aiming marks 200 includes a body 202, a first optical element 204, a first partially-reflective surface 206, a first light source 208, a second optical element 212, a second partially-reflective surface 214, a second light source 216, and windage screws 220, 222. In this embodiment, the first light source 208 is placed rearward of the first optical element 204. The second optical element 212 is placed rearward of the first light source 208, and the second light source 216 is placed rearward of the second optical element 212. As with the embodiment discussed above with respect to FIG. 1, the first and second optical elements 204, 212 are curved with generally spherical curvature, and the first light source 208 and the second light source 216 are positioned at a focal point of the respective first and second partially-reflective surfaces 206, 214, such that light reflected rearward by the first and second partially-reflective surfaces 206, 214 is collimated light 210, 218. In this embodiment, the radiuses of curvature of the first and second partially-reflective surfaces 206, 214 may be the same or slightly different.

As in the embodiment of FIG. 1, the first light source 208 and the second light source 216 preferably output light at different wavelengths; and the first and second partially-reflective surfaces 206, 214 have dichroic coatings selectively reflective to the wavelengths of the light emitted by the respective first and second light sources 208, 216, while being highly transmissive of other wavelengths of visible light. So, for example, collimated light 210 reflected rearwardly by first partially-reflective surface 206 will pass through second partially-reflective surface 214 and to the user's eye 230. Alternatively, the first and second light sources 208, 216 could output light at the same wavelength, in which case the second partially-reflective surface 214 must be partially reflective of the wavelength (e.g., 40%-60% transmissive, or preferably approximately 50% transmissive), to allow some light from first light source 208 to pass therethrough and be reflected rearwardly toward the user's eye 230 by first partially-reflective surface 206, albeit with its intensity attenuated.

Although body 202 is shown as flat in FIG. 4, body 202 is not so limited and may take any shape for a reflex sight, including mounting the first light source 208 and the second light source 216 on different surfaces and planes of the reflex sight.

Figure 5:
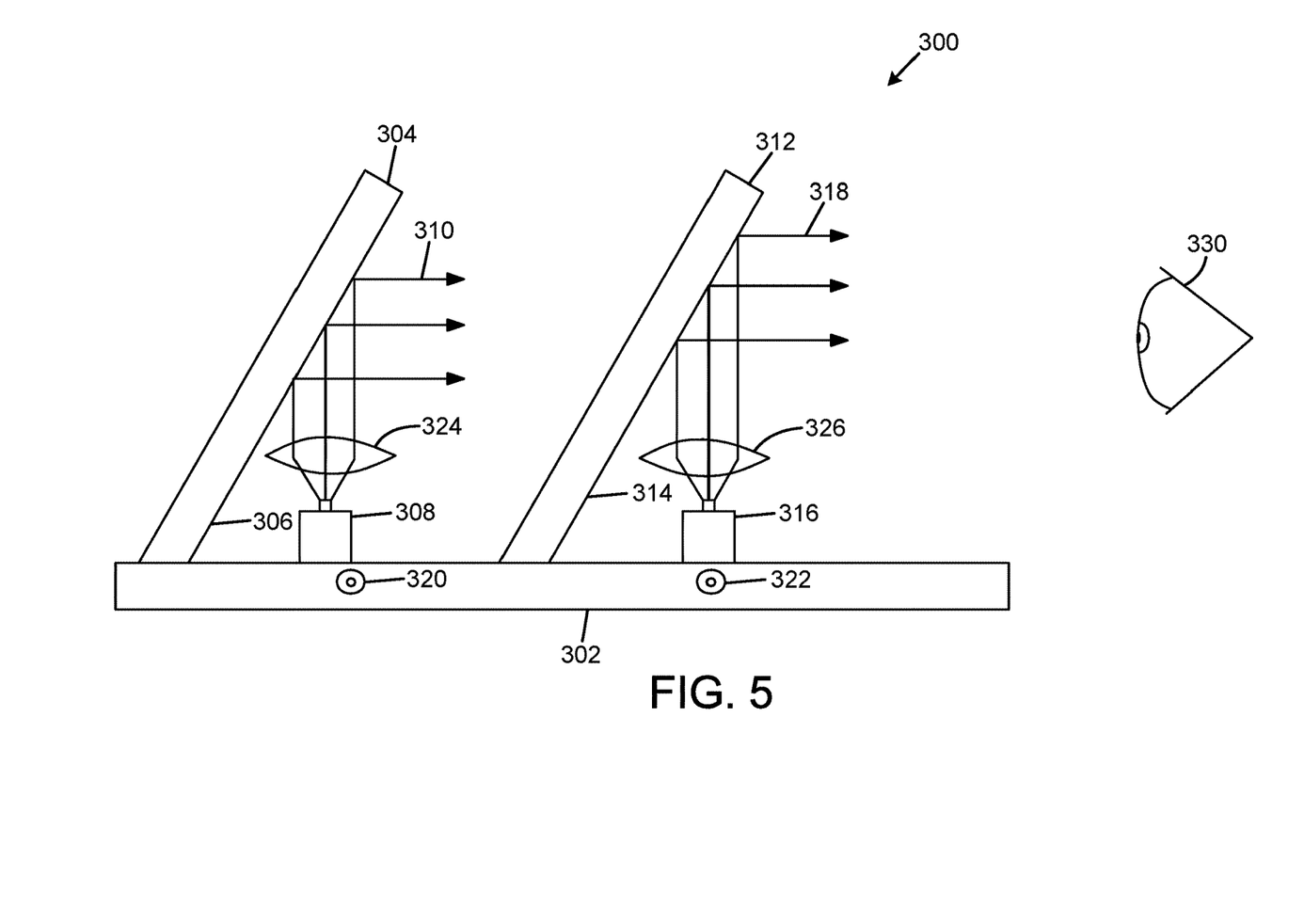
FIG. 5 is a side view of a second alternative embodiment of the reflex sight with multiple aiming marks having two light sources, two flat reflectors, and two collimating lenses.

FIG. 5 illustrates a second alternative embodiment of the improved reflex sight with multiple aiming marks 300 of the present invention. More particularly, the reflex sight with multiple aiming marks 300 includes a body 302 supporting a first flat optical element 304 having a first partially-reflective surface 306, a first light source 308, a second flat optical element 312 having a second partially-reflective surface 314, and a second light source 316. Optical elements 304, 312 may be flat glass plates. The reflex sight with multiple aiming marks 300 includes a first collimating lens 324 that collimates the light emitted from the first light source 308 before the light reaches and is reflected rearwardly by the first (flat) partially-reflective surface 306, and a second collimating lens 326 that collimates light from the second light source 316 before the light reaches and is reflected rearwardly by the second (flat) partially-reflective surface 314.

The first and second partially-reflective surfaces 306, 314 reflect the respective collimated light 310, 318 rearwardly toward a user's eye 330. A user perceives the reflected light 310, 318 as respective first and second luminous aiming marks 900, 902 (FIG. 11), spaced apart and superimposed on, and in focus with, targets in the field of view 904 located at any distance (infinity focus). The positions of the first and second light sources 308, 316 can be independently adjusted via windage screws 320, 322, respectively, and/or elevation screws (not shown), to adjust the spacing between the first and second luminous aiming marks 900, 902 during sighting-in or otherwise. As in the embodiment of FIG. 1, the first light source 308 and the second light source 316 may output light at different wavelengths; and the first and second partially-reflective surfaces 306, 314 have dichroic coatings selectively reflective to the wavelengths of the light emitted by the respective first and second light sources 308, 316, while being highly transmissive of other wavelengths of visible light. So, for example, collimated light 310 reflected rearwardly by the first partially-reflective surface 306 will pass through the second partially-reflective surface 314 and to a user's eye 330.

Although the light sources 308, 316 are illustrated facing upwards with light emitting upward toward collimating lenses 324, 326, the first and second light sources 308, 316, first and second collimating lenses 324, 326 and first and second optical elements 304, 312 may be positioned in other arrangements that allow the collimated light 310, 318 to reflect toward the user's eye 330.

Figure 6:
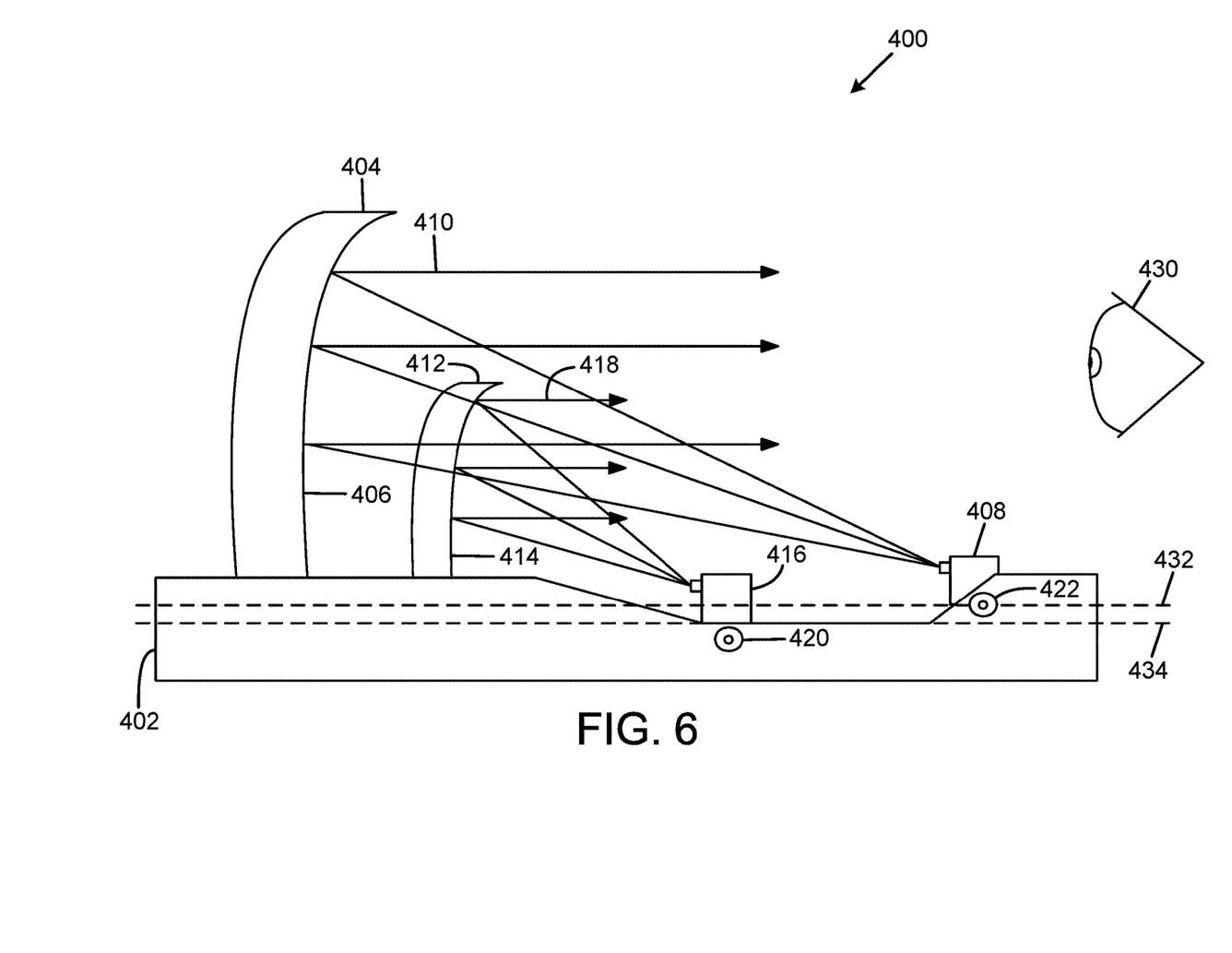
FIG. 6 is a side view of a third alternative embodiment of the reflex sight with multiple aiming marks having two light sources and two curved reflector lenses.

FIG. 6 illustrates a third alternative embodiment of the improved reflex sight with multiple aiming marks 400 of the present invention. More particularly, the reflex sight with multiple aiming marks 400 includes a body 402 supporting a first curved optical element 404 bearing a first partially-reflective surface 406, a first light source 408, a second curved optical element 412 bearing a second partially-reflective surface 414, and a second light source 416. In this embodiment, the second optical element 412 is placed rearward of the first optical element 404, and the first and second light sources 408 and 416 are placed rearward of the second optical element 412, with the first light source 408 being placed rearward of the second light source 416. Thus, the second optical element 412 and the second light source/emitter 416 are interposed between the first optical element 404 and the first light source/emitter 408. As with the embodiment discussed above with respect to FIG. 1, the first and second partially-reflective surfaces 406, 414 are curved to form spherical reflectors, and the first and second light sources 408, 416 are positioned at focal points of the respective first and second partially-reflective surfaces 406, 414.

Light from the first light source 408 may be the same or a different wavelength of light from the second light source 416. If the wavelengths of light emitted by the first and second light sources 408, 416 are different, the dichroic coating or layer of the first partially-reflective surface 406 primarily reflects the wavelength of light from the first light source 408 as collimated light 410 and the dichroic coating or layer of the partially-reflective surface 414 primarily reflects the wavelength of light from the second light source 416 as collimated light 418. Light that is not reflected passes through the first and/or second optical elements 404, 412.

If the first and second light sources 408, 416 emit light of the same wavelength, the dichroic coatings or layers of the first and second partially-reflective surfaces 406, 414 will both reflect the light from the first light source 408. (Light from the first light source 408 may not reach the first partially-reflective surface 406 because it may be occluded by second partially-reflective surface 414.) Second partially-reflective surface 414 will block some of the light from first light source 408 and prevent it from reaching the first partially-reflective surface 406, which will reduce the brightness of the aiming mark generated by the reflection from the first partially-reflective surface 406.

However, because the first light source 408 is not positioned at the focal point of second partially-reflective surface 414, the portion of the light from first light source 408 that is reflected by the second partially-reflective surface 414 will not be collimated and will not form an extra image.

In the embodiment shown in FIG. 6, first light source 408 is positioned on a first plane 432 and second light source 416 is positioned on a second plane 434 spaced below the first plane 432. This prevents the second light source 416 from blocking the light from the first light source 408. Also, the radius of curvature of the second optical element 412 is significantly smaller than the radius of curvature of the first optical element 404, so the focal point of the spherical reflector of the second partially-reflective surface 414 and, thus, the second light source 416, are closer than (i.e., forward of) the first light source 408 located at the focal point of the first partially-reflective surface 406.

Further, since the second optical element 412 is smaller than the first optical element 404, light reflected from each of the first and second optical elements 404, 412 reaches the user's eye 430, allowing the user to perceive both the first and second luminous aiming marks 900, 902 (FIG. 11) simultaneously. This is the case even if the second partially-reflective surface 414 blocks a portion of light from the first light source 408 from reaching the first partially-reflective surface 406—for example, if the first and second light sources 408, 416 are of the same wavelength and the first and second partially-reflective surfaces 406, 414 are completely reflective of that wavelength. Furthermore, if the user's eye is above the uppermost portion of second optical element 412, the user will be unable to perceive collimated light 418 of second light source 416 and will only perceive the collimated light 410 of first light source 408. Thus, the user can selectively switch perception of light source 416 by a change of eye position.

Figure 7:
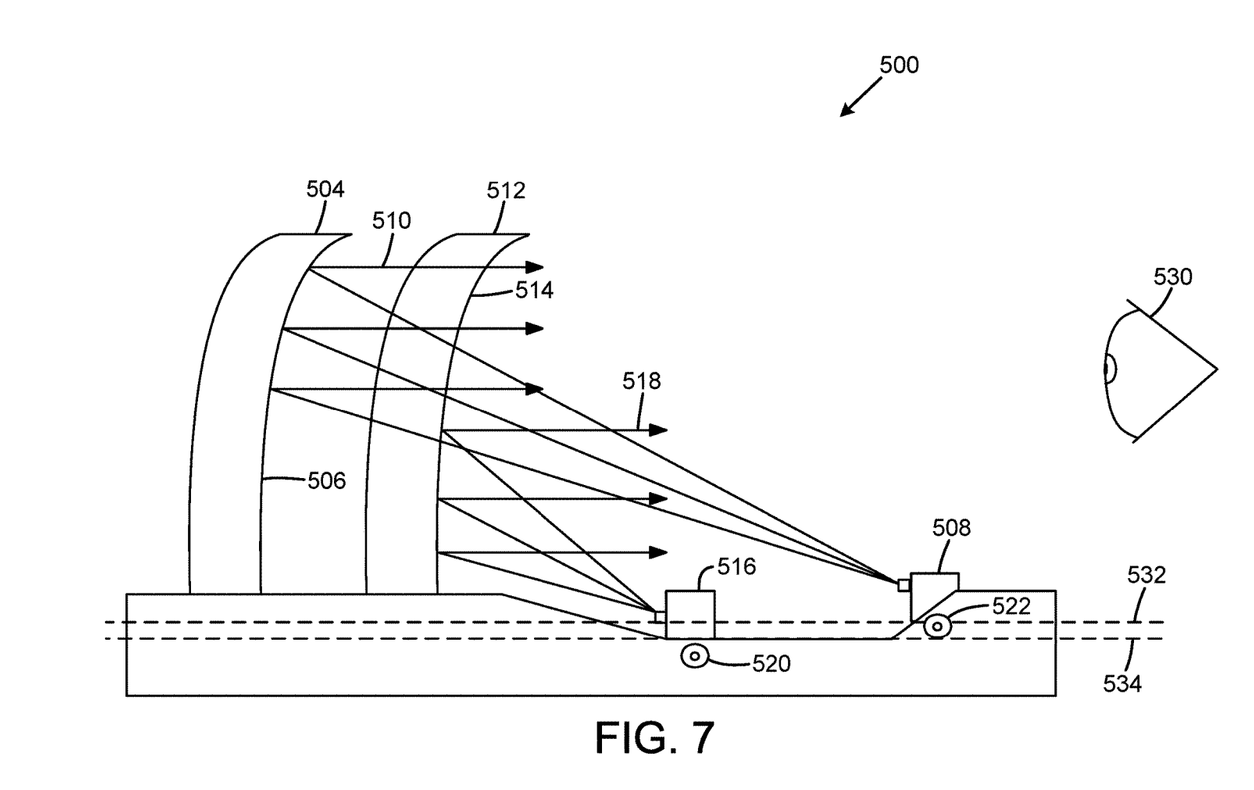
FIG. 7 is a side view of a fourth alternative embodiment of the reflex sight with multiple aiming marks having two light sources and two curved reflector lenses.

FIG. 7 illustrates a fourth alternative embodiment of the improved reflex sight with multiple aiming marks 500 of the present invention. More particularly, unlike the embodiment of FIG. 6, the second curved optical element 512 in this embodiment is of an approximately equal height and/or equal size to the first curved optical element 504. Also, as in the embodiment of FIG. 6, the radius of curvature of the second optical element 512 is significantly smaller than the radius of curvature of the first optical element 504, so the focal point of the spherical reflector of the second partially-reflective surface 514 and, thus, the second light source 516, are closer than (i.e., forward of) the first light source 508 located at the focal point of the first partially-reflective surface 506. The first light source 508 and the second light source 516 preferably output light at different wavelengths; and the first and second partially-reflective surfaces 506, 514 have dichroic coatings selectively reflective to the wavelengths of the light emitted by the respective first and second light sources 508, 516, while being highly transmissive of other wavelengths of visible light, and primarily reflect the wavelength of light from the first and second light sources 508, 516 as collimated light 510, 518. So, for example, collimated light 510 reflected rearwardly by first partially-reflective surface 506 will pass through second partially-reflective surface 514 and to the user's eye 530. Alternatively, the first and second light sources 508, 516 could output light at the same wavelength, in which case the second partially-reflective surface 514 must be partially reflective of the wavelength (e.g., 40%-60% transmissive, or preferably approximately 50% transmissive), to allow some light from first light source 508 to pass therethrough and be reflected rearwardly toward the user's eye 530 by first partially-reflective surface 506, albeit with its intensity attenuated.

In the embodiment shown in FIG. 7, first light source 508 is positioned on a first plane 532 and second light source 516 is positioned on a second plane 534 spaced below the first plane 532. This prevents the second light source 516 from blocking the light from the first light source 508.

Figure 8:
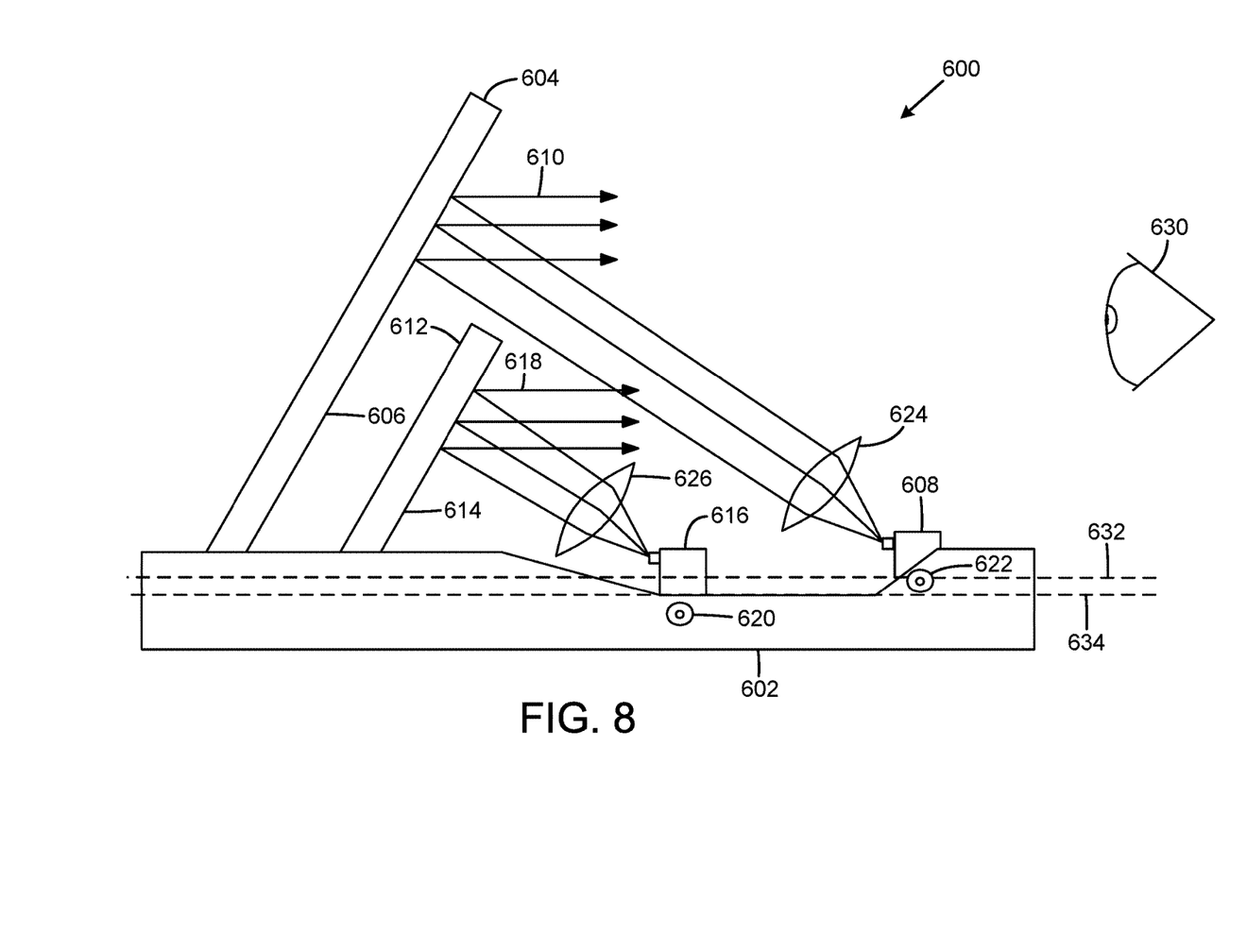
FIG. 8 is a side view of a fifth alternative embodiment of the reflex sight with multiple aiming marks having two light sources, two flat reflectors, and two collimating lenses.

FIG. 8 illustrates a fifth alternative embodiment of the improved reflex sight with multiple aiming marks 600 of the present invention. More particularly, the reflex sight with multiple aiming marks 600 is like the reflex sight with multiple aiming marks 400 discussed above with respect to FIG. 6, except having flat reflectors instead of curved reflectors. Reflex sight with multiple aiming marks 600 includes a body 602, a first (flat) optical element 604, a first partially-reflective surface 606, a first light source 608, a second (flat) optical element 612, a second partially-reflective surface 614, a second light source 616, and windage screws 620, 622. As in the embodiment of FIG. 5, discussed above, in the embodiment of FIG. 8, light emitted from the first light source 608 is collimated by a first collimating lens 624 prior to being reflected from the first (flat) partially-reflective surface 606. Reflex sight 600 also includes a second collimating lens 626 that collimates the light from the second light source 616 prior to being reflected by the second partially-reflective surface 614. Like the embodiment of FIG. 6, discussed above, the wavelength of light from the first light source 608 and the second light source 616 may be the same or different, and the dichroic coatings or layers of the partially-reflective surfaces 606, 614 are based on the wavelength of light from the respective first and second light sources 608, 616. Thus, the dichroic coating or layer of the first partially-reflective surface 606 primarily reflects the wavelength of light from the first light source 608 as collimated light 610, and the dichroic coating or layer of the partially-reflective surface 614 primarily reflects the wavelength of light from the second light source 616 as collimated light 618.

In the embodiment shown in FIG. 8, first light source 608 is positioned on a first plane 632 and second light source 616 is positioned on a second plane 634 spaced below the first plane 632. This prevents the second light source 616 from blocking the light from the first light source 608.

Figure 9:
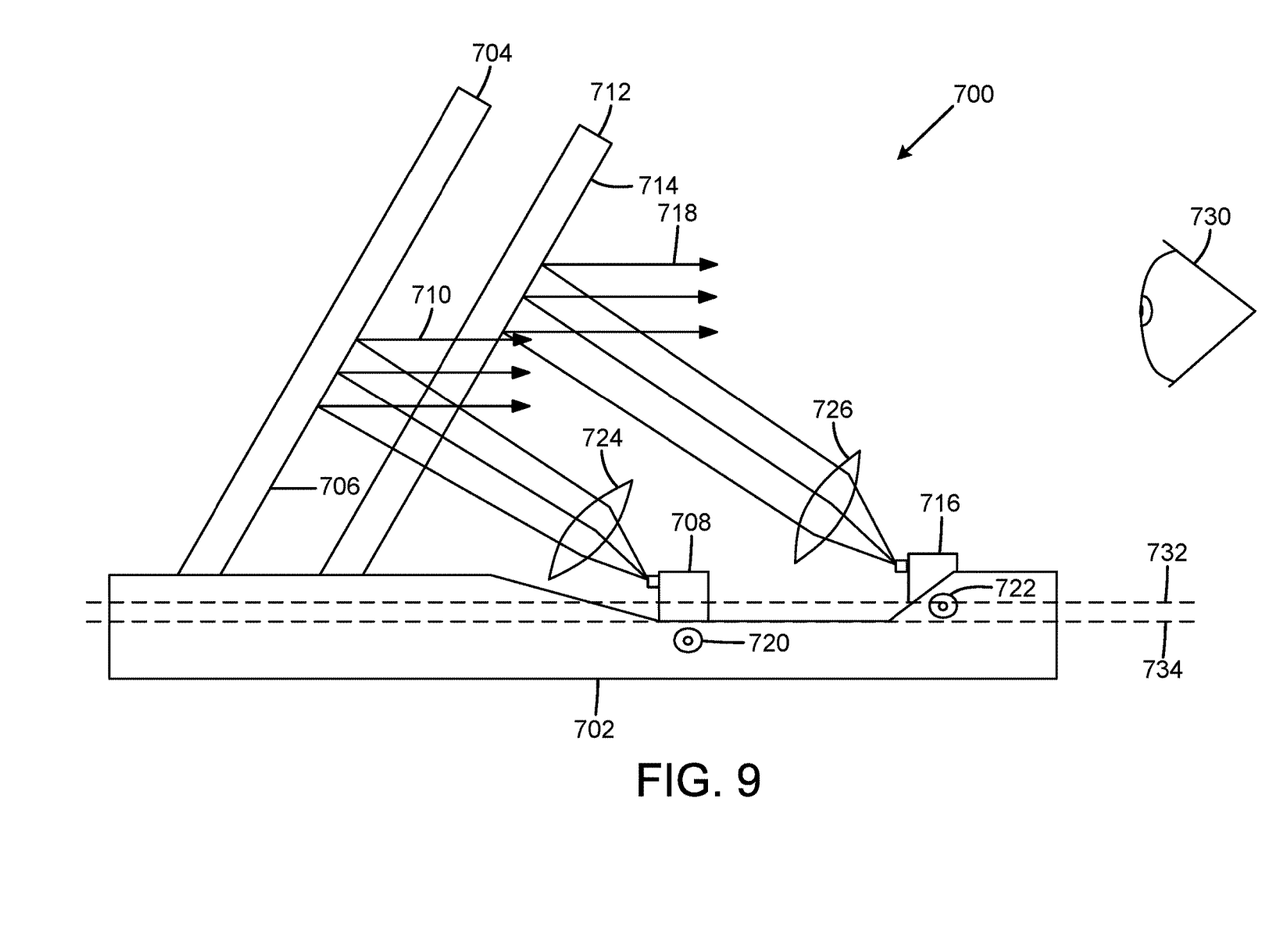
FIG. 9 is a side view of a sixth alternative embodiment of the reflex sight with multiple aiming marks having two light sources, two flat reflectors, and two collimating lenses.

FIG. 9 illustrates a sixth alternative embodiment of the improved reflex sight with multiple aiming marks 700 of the present invention. More particularly, the reflex sight with multiple aiming marks 700 is like reflex sight with multiple aiming marks 600 of FIG. 8, except that the light from the first light source 708 is collimated by a first collimating lens 724 prior to reaching the first (flat) optical element 704 and light from the second light source 716 is collimated by a second collimating lens 726 prior to reaching the second (flat) optical element 712. Like each of the embodiments discussed above, the beams of collimated light 710 and 718 are reflected by respective first and second partially-reflective surfaces 706 and 714 rearward toward a user's eye 730 so that a user perceives the reflected light as spaced-apart first and second luminous aiming marks 900, 902 (FIG. 11) superimposed on, and in focus with, targets in the field of view 904 at any distance (infinity focus).

Like FIG. 8 discussed above, the wavelength of light from the first light source 708 and the second light source 716 may be the same or different, and the dichroic coatings or layers of partially-reflective surfaces 706, 714 are based on the wavelength of light from the respective first and second light source 708, 716.

In the embodiment shown in FIG. 9, first light source 708 is positioned on a first plane 732 and second light source 716 is positioned on a second plane 734 spaced below the first plane 732. This prevents the second light source 716 from blocking the light from the first light source 708.

Figure 10:
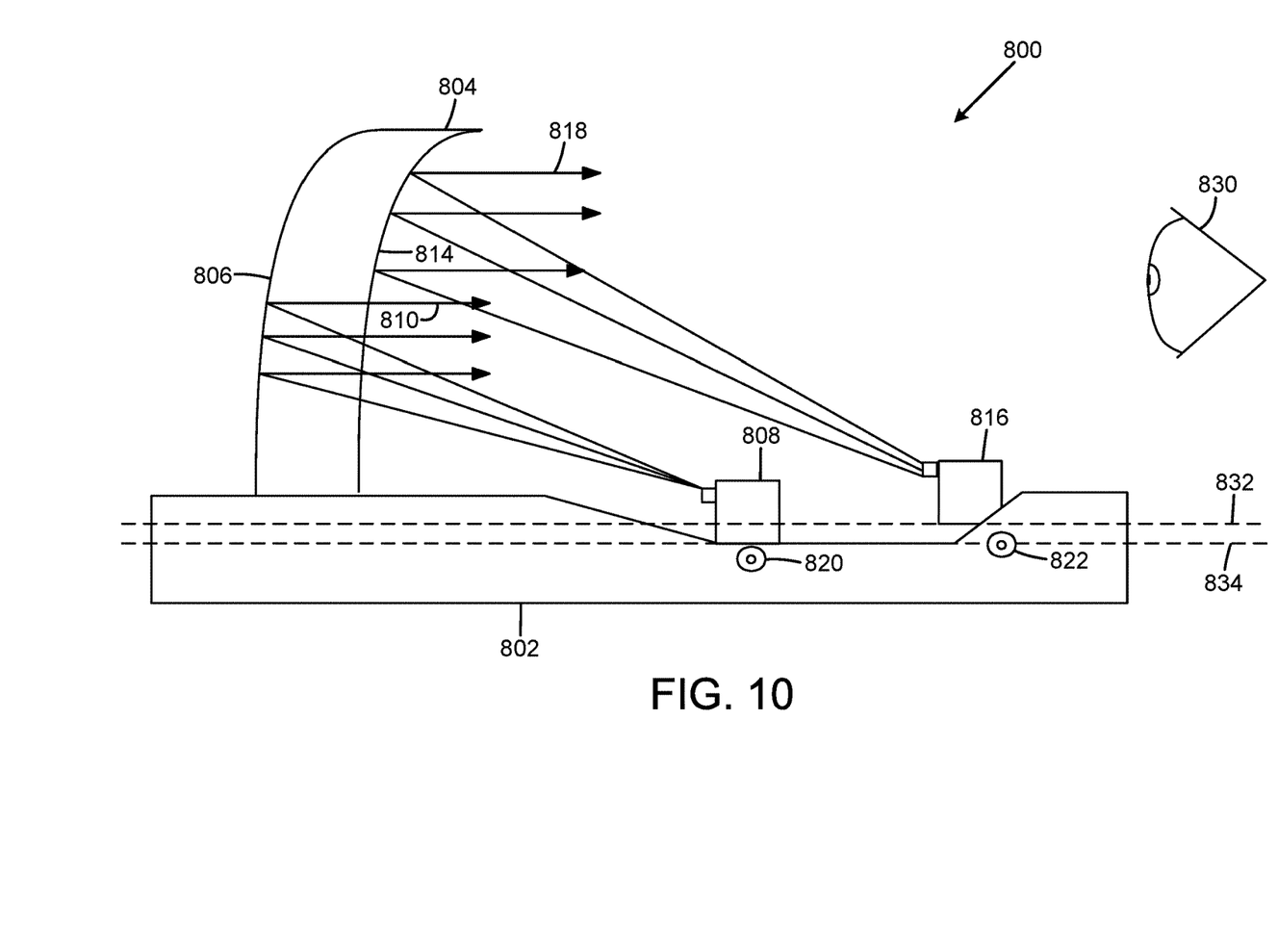
FIG. 10 is a side view of a seventh alternative embodiment of the reflex sight with multiple aiming marks having two light sources and a single curved reflector lens.

FIG. 10 illustrates a seventh alternative embodiment of the improved reflex sight with multiple aiming marks 700 of the present invention. More particularly, the reflex sight with multiple aiming marks 700 has a first partially-reflective surface 806 formed on a forward face of an optical element 804 and the second partially-reflective surface 814 formed on an opposite rearward face of the same optical element 804. The dichroic coating or layer of the first partially-reflective surface 806 primarily reflects a wavelength of light with a first wavelength and the dichroic coating or layer of the second partially-reflective surface 814 primarily reflects a second wavelength of light different from the first wavelength of light. Light from the first light source 808 travels through the second partially-reflective surface 814 of the optical element 804 since it is a wavelength of light that is not reflected by the dichroic coating or layer of the second partially-reflective surface 814, and reflects from the first partially-reflective surface 806 rearward and back through the second partially-reflective surface 814 toward a user's eye 830 as collimated light 810 so that a user perceives the reflected light 810 as a first luminous aiming mark 900 superimposed on, and in focus with, targets in the field of view at any distance (infinity focus). Light from the second light source 816 reflects from the second partially-reflective surface 814 rearward toward a user's eye 830 as collimated light 818 so that a user perceives the reflected light 818 as a second illuminated aiming mark 902 superimposed on, and in focus with, targets in the field of view at any distance (infinity focus), and spaced apart from the first luminous aiming mark 900.

In the embodiment shown in FIG. 10, first light source 808 is positioned on a first plane 832 and second light source 816 is positioned on a second plane 834 spaced below the first plane 832. This prevents the second light source 816 from blocking the light from the first light source 808.

Figure 11:
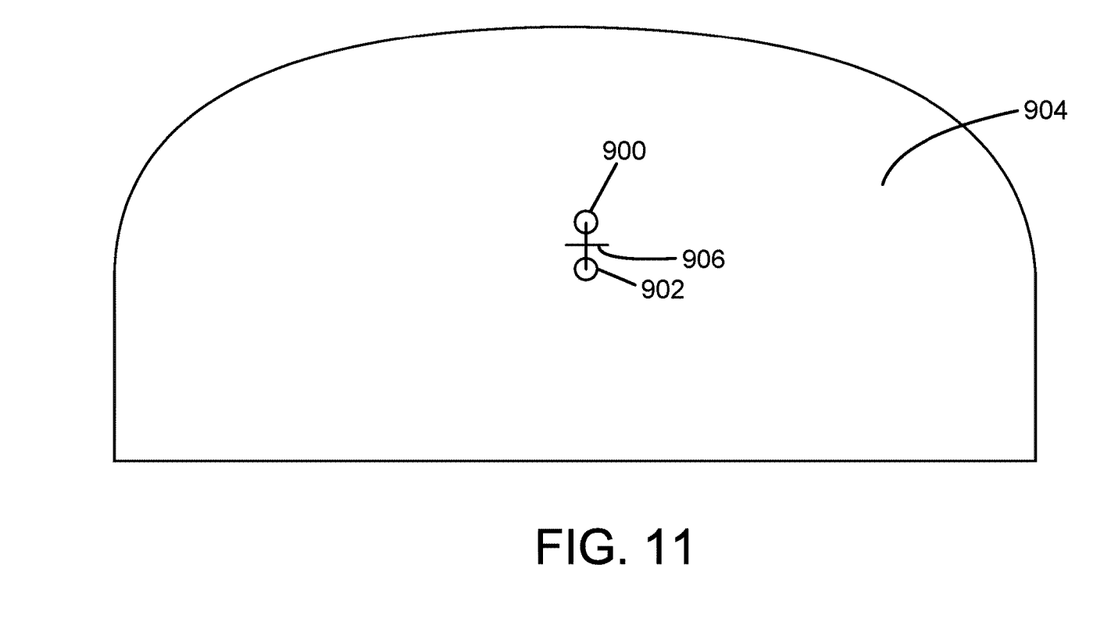
FIG. 11 is an example of a user's view of aiming marks generated by any of the embodiments of the reflex sight with multiple aiming marks of FIGS. 1-10.

FIG. 11 illustrates a viewing field (field of view 904) of any of the reflex sights with multiple aiming marks discussed above. In the field of view 904, spaced-apart first and second aiming marks 900, 902 can be seen. Each of these aiming marks 900, 902 can be adjusted independently of the other by adjusting windage and/or elevation screws of the first light source and the second light source, as discussed above. Although windage and elevation screws above discussed adjusting the first and second light sources, alternatively the viewed positions of the aiming marks relative to the point of impact can be adjusted by adjusting the positions of the first and second optical elements (e.g., 104 and 112) instead of or in addition to the positions of the first and second light sources. The sight line axis 906 extends from a target (not shown) to a viewer's eye through the optical elements.

In other embodiments (not shown), more than two aiming marks are generated using light sources generating more than two points of light, such that each reflector generates images of multiple spaced-apart aiming marks, or using more than two light sources and more than two partially-reflective surfaces. When more than two aiming marks are generated, the multiple aiming marks may be spaced horizontally to provide windage aiming, or both vertically and horizontally for holdover and windage, or for other purposes.

Control over the quantity of aiming marks shown to the user can be achieved not only by selector switch 148, but could also be achieved through the reflex sight reading an RFID tag on a magazine or round to automatically switch to display of the appropriate aiming mark(s). Alternatively, the reflex sight could incorporate an accelerometer that can detect the transition from one type of round to another by differences in the amount of recoil and switch to displaying the appropriate aiming mark(s) associated with the velocity of the most recently fired round.

While current embodiments of a reflex sight with multiple aiming marks have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, different thicknesses of dichroic coatings or layers can be used to achieve different amounts of reflectiveness of the desired wavelength.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An optical sight for a projectile weapon comprising:
a body having a forward end extending in forward direction and an opposed rearward end extending in a rearward direction;
a first optical element having a first concave surface facing in the rearward direction;
the first concave surface having a first focal point;
a second optical element having a second concave surface facing in the rearward direction;
the second concave surface having a second focal point;
a first emitter proximate the first focal point and spaced apart from the second focal point;
a second emitter proximate the second focal point and spaced apart from the first focal point;
the first optical element being forward of the second optical element; and
wherein the first and second emitters are both rearward of the first and second optical elements.

2. The optical sight of claim 1 wherein the second emitter is spaced apart rearwardly from the first emitter.

3. The optical sight of claim 1 wherein the first emitter emits radiation at a first wavelength, and the second emitter emits radiation at a different second wavelength.

4. The optical sight of claim 3 wherein the first concave surface has a first reflective characteristic, and the second concave surface has a different second reflective characteristic.

5. The optical sight of claim 4 wherein the first characteristic is relatively greater reflectivity of the first wavelength than the second wavelength, and the second characteristic is relatively greater reflectivity of the second wavelength than the first wavelength.

6. The optical sight of claim 1 wherein each optical element is a lens with a base curve having limited distortive effect on images viewed through the lenses.

7. The optical sight of claim 1 wherein the second optical element is interposed between the first optical element and the first emitter, such that emissions from the first emitter are transmitted through the second optical element before reflecting off the first surface, and a reflected image from the first surface is transmitted through the second optical element before reaching a viewer rearward of the sight.

8. The optical sight of claim 1 wherein the second optical element and the first emitter are interposed between the first optical element and the second emitter.

9. The optical sight of claim 1 including a first adjustment facility adapted to move the apparent image of the first emitter as reflected in the first surface, and a second adjustment facility adapted to move the apparent image of the second emitter as reflected in the second surface.

10. An optical sight for a projectile weapon comprising:
a body having a forward end extending in forward direction and an opposed rearward end extending in a rearward direction;
a first optical element having a first reflective surface;
a second optical element rearward of the first optical element and having a second reflective surface;
a first emitter adapted in conjunction with the first reflective surface to project an image of the first emitter in a rearward direction;
a second emitter adapted in conjunction with the second reflective surface to project an image of the second emitter in a rearward direction;
an optical path extending between the forward end and the rearward end, and through both the first and second optical elements; and
wherein the first and second emitters are both rearward of the first and second optical elements.

11. A reflex sight system for a projectile weapon, comprising:
a body;
a first light source attached to the body to output a first light;

a first semi-reflective surface attached to the body through which a viewer views a target in a viewing path, the first semi-reflective surface reflects the first light as collimated light to create in the viewer's eye an image of a first mark to align with the target in the viewing path;

a second light source attached to the body to output a second light, the second light source spaced apart from the first light source on the body;

a second semi-reflective surface attached to the body through which the viewer views the target in the viewing path, the second semi-reflective surface reflecting the second light as collimated light to create in the viewer's eye an image of a second mark simultaneously with the first mark;

wherein the first light source, the second light source, the first semi-reflective surface, and the second semi-reflective surface are positioned such that the first mark appears spaced apart from the second mark; and wherein the first and second light sources are both rearward of the first and second semi-reflective surfaces.

12. The reflex sight system of claim 11, wherein the first light has a first wavelength and the second light has a second wavelength different from the first wavelength, and wherein the first semi-reflective surface includes a dichroic coating to reflect primarily the first wavelength of the first light and the second semi-reflective surface includes a dichroic coating to reflect primarily the second wavelength of the second light.

13. The reflex sight system of claim 12 wherein the first light source and the second semi-reflective surface are positioned on the body between the second light source and the first semi-reflective surface.

14. The reflex sight system of claim 13, wherein a height of the second semi-reflective surface is less than a height of the first semi-reflective surface.

15. The reflex sight system of claim 13, wherein the first semi-reflective surface and the second semi-reflective surface are the same height.

16. The reflex sight system of claim 12, wherein the second semi-reflective surface is positioned between the first light source and the first semi-reflective surface on the body and the second light source is positioned rearward of the first light source on the body proximal of the viewer's eye.

17. The reflex sight system of claim 16, wherein the first light source is positioned on a first plane and the second light source is positioned on a second plane spaced apart from the first plane.

18. The reflex sight system of claim 12, wherein the first and second semi-reflective surfaces are supported on respective forward and rearward faces of a common optical element.

19. The reflex sight system of claim 12, wherein the first semi-reflective surface is curved, the second semi-reflective surface is curved, the first light source is positioned on the body at a focal point of the first semi-reflective surface, and the second light source is positioned on the body at a focal point of the second semi-reflective surface that is spaced apart from the focal point of the first semi-reflective surface.

20. The reflex sight system of claim 19, wherein a focal length of the first semi-reflective surface is greater than a focal length of the second semi-reflective surface.

21. The reflex sight system of claim 19, wherein a focal length of the first semi-reflective surface is substantially equal to the focal length of the second semi-reflective surface.

22. The reflex sight system of claim 12, further comprising:
a first collimating lens for collimating the first light prior to being reflected by the first semi-reflective surface; and
a second collimating lens for collimating the second light prior to being reflected by the second semi-reflective surface.

23. The reflex sight system of claim 11, wherein the first light source is adjustable independent of the second light source to adjust the image of the first mark relative to the target and the second light source is adjustable independent of the first light source to adjust the image of the second mark relative to the target.

24. The reflex sight system of claim of claim 11, wherein the first and second semi-reflective surfaces are part of a single element.

25. A method for displaying multiple aiming marks in a reflex sight, comprising the steps of:
projecting a first light from a first light source;
collimating the first light;
reflecting on a first semi-reflective surface through which a viewer views a target in a viewing path the collimated first light to create an image in the viewer's eye of a first mark;
projecting a second light from a second light source;
transmitting the second light through the first semi-reflective surface;
collimating the second light; and
reflecting on a second semi-reflective surface through which the viewer views the target in the viewing path the collimated second light and transmitting the collimated second light through the first semi-reflective surface to create an image in the viewer's eye of a second mark.

26. The method of claim 25 wherein:
the first light has a first wavelength and the second light has a second wavelength different from the first wavelength;
the first semi-reflective surface includes a dichroic coating primarily reflective of the first wavelength of the first light and transmissive to other visible wavelengths; and
the second semi-reflective surface includes a dichroic coating primarily reflective of the second wavelength of the second light and transmissive to other visible wavelengths.

27. The method of claim 25 wherein the first semi-reflective surface is formed on a forward face of an optical element and the second semi-reflective surface is formed on a rearward face of the optical element.

28. The method of claim 25 wherein the first semi-reflective surface is curved and collimates the first light and the second semi-reflective is curved and collimates the second light.

29. The method of claim 25 wherein a first collimating lens collimates the first light and a second collimating lens collimates the second light.

30. The method of claim 25 further comprising adjusting positions of the first and second light sources independently of each other to adjust the positions of the images of the first and second marks relative to the target.

31. The method of claim 25 further comprising creating an image in the viewer's eye of a second mark simultaneously with and spaced apart from the first mark.

* * * * *